UNITED STATES PATENT OFFICE.

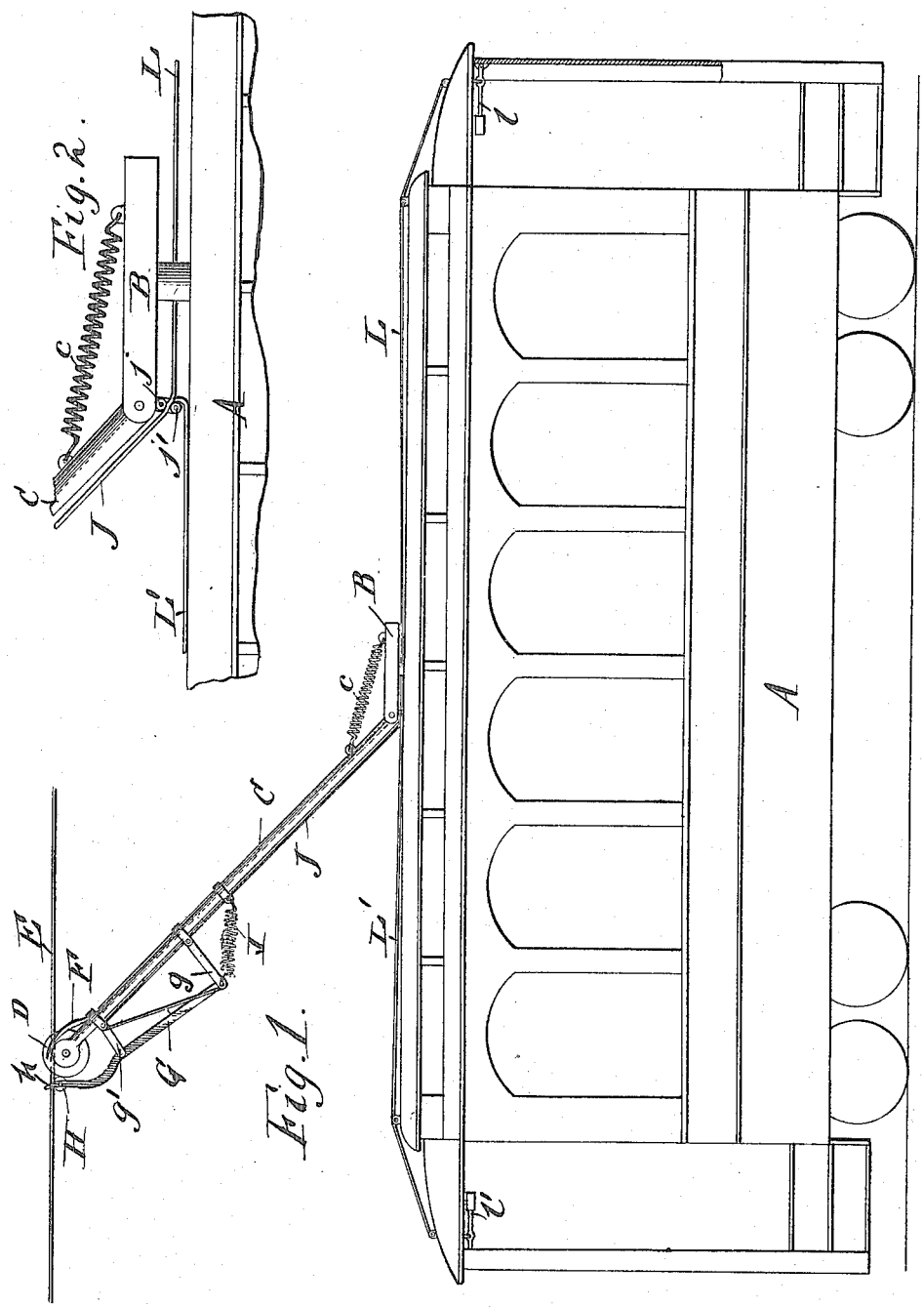

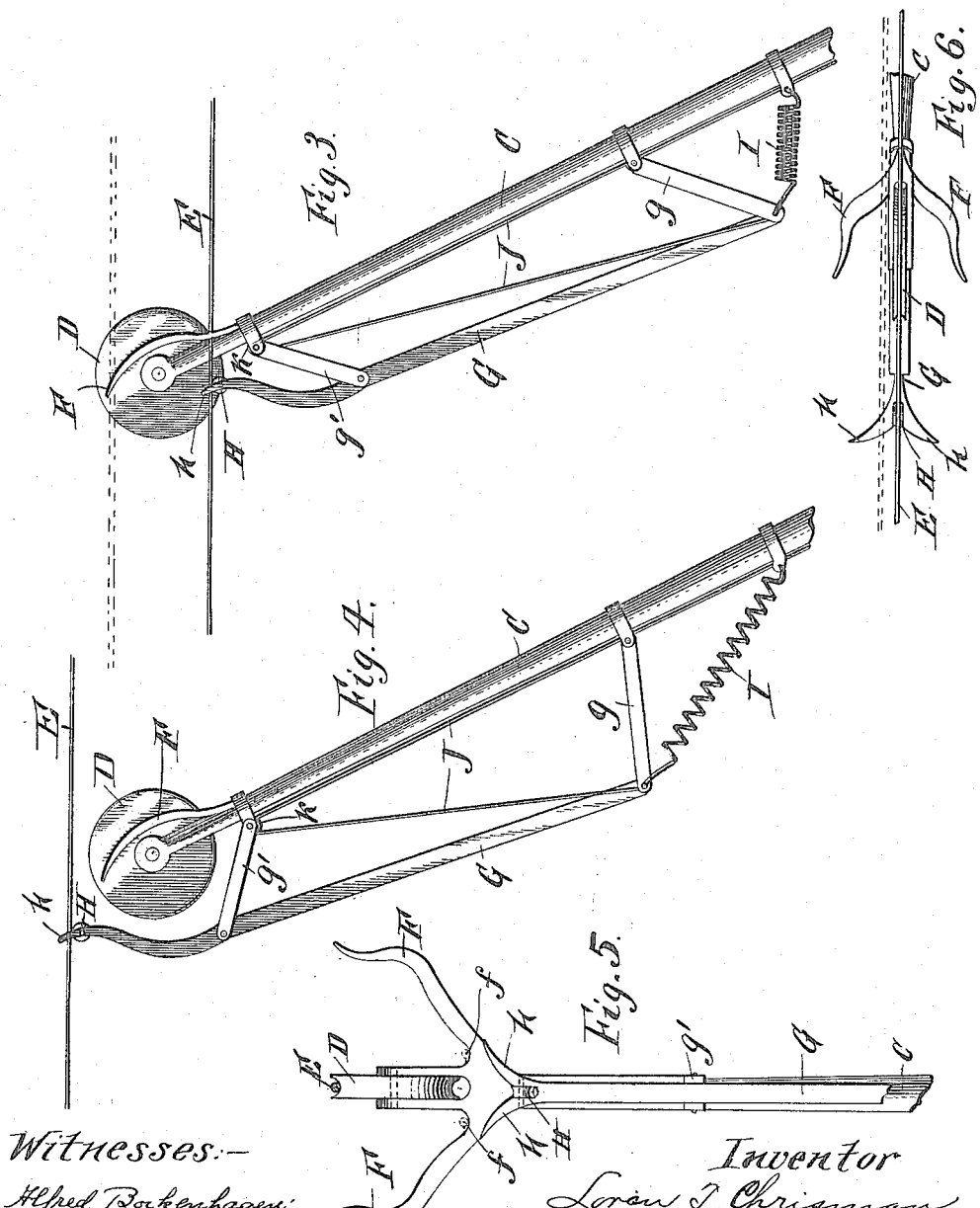

LORAN T. CHRISMAN, OF BUFFALO, NEW YORK, ASSIGNOR OF ONE-FOURTH TO JOHN G. WICKSER, ONE-FOURTH TO EDWARD MAYER, AND ONE-FOURTH TO JOHN MAYER, ALL OF BUFFALO, NEW YORK.

TROLLEY-RESTORER.

1,133,263.     Specification of Letters Patent.     Patented Mar. 30, 1915.

Application filed August 24, 1910, Serial No. 578,701. Renewed August 25, 1914. Serial No. 858,515.

*To all whom it may concern:*

Be it known that I, LORAN T. CHRISMAN, a citizen of the United States, residing at Buffalo, in the county of Erie and State of New York, have invented new and useful Improvements in Trolley-Restorers, of which the following is a specification.

The object of this invention is the production of a trolley restorer which permits of positively restoring the trolley to the overhead wire and particularly by means which may be operated from either end of the car.

In the accompanying drawings consisting of 2 sheets: Figure 1 is a side elevation of a car having its trolley mechanism equipped with my improved restorer. Fig. 2 is an enlarged fragmentary side view of the trolley stand and adjacent parts. Fig. 3 is a side elevation, on an enlarged scale, showing the trolley pole, wheel and restorer in the position which they occupy when the wheel has left the trolley wire and passed above the latter. Fig. 4 is a similar view showing the position of these parts in the act of restoring the trolley to the wire. Fig. 5 is a rear elevation of the trolley restorer and adjacent parts. Fig. 6 is a top plan view thereof.

Similar letters of reference indicate corresponding parts throughout the several views.

A represents the body of the car, B the horizontally rotatable trolley stand pivoted on top of the car, C the trolley pole pivoted on the stand and held yieldingly in its elevated position by means of a spring $c$ connecting the trolley pole with the stand, D the trolley wheel pivoted on the upper end of the pole and E the trolley wire with which the wheel normally engages.

On opposite sides of the trolley wheel are arranged two downwardly converging catch horns F which are connected at their lower ends with the trolley pole below the wheel and form two crotches or seats $f, f$ at the junction of these horns with the trolley pole. The relative arrangement and spread of these horns is such that when the trolley wheel leaves the wire and is carried upwardly, the trolley wire will be caught by either one or the other of these horns and directed toward the crotch or seat $f$ at the base of this horn.

Lengthwise in rear of the trolley pole is arranged an upright restoring bar G which is pivotally connected at its lower end with the trolley pole by means of a comparatively long link $g$ and also pivotally connected near its upper end with the trolley pole by a comparatively short link $g^1$. At its upper end the restoring bar G is provided with a comparatively small restoring fork the horns $h$ of which diverge upwardly. In the crotch between the restoring horns and pivoted on the restoring bar is an anti-friction roller H.

When the restoring device is not in use the bar G is yieldingly held in its lowermost position, so that the restoring horns $h$ and roller H are arranged adjacent to the lower part of the periphery of the trolley wheel, as shown in Fig. 3. Various means may be employed for thus holding the restoring bar and associated parts in their retracted position, the means for this purpose shown in the drawings comprising a spring I connected at its opposite ends with the lower link $g$ and the adjacent part of the trolley pole.

After the trolley jumps upwardly off the wire and is caught by one of the catch horns F and directed toward the crotch $f$ thereof, the motorman or attendant raises the restoring bar G and then permits the same to drop again. During this upward movement of the restoring bar one or the other of the restoring horns $h$ engages with the trolley wire in one of the crotches $f$ and lifts the same therefrom. As the trolley wire is carried by the restoring horn $h$ above the trolley wheel the inclination of this horn directs the trolley wire toward the restoring wheel H, so that the wire is now directly above the trolley wheel D, whereby the trolley wire is deposited or returned to the groove of the trolley wheel upon again permitting the restoring bar to drop into its normal position, as shown in Fig. 1.

By making the lower link $g$ longer than the upper link $g^1$ the movement of the fork $h$ is substantially parallel with the axis of the pole and stands in its lowermost position close to the underside of the trolley wheel and in its elevated position close to the upper side of the latter, so that upon lowering the fork the wire therein will be reliably deposited in the groove of the trolley wheel.

The lowering of the restoring bar and associated parts is effected automatically by the spring I but the raising of these parts is effected manually by any suitable means. The preferred means for this purpose, however, are so constructed that this raising can be done from either side of the car and are preferably constructed as follows: J represents a main upwardly looped restoring line which passes at one end through a guide on the trolley stand consisting preferably of two rollers $j$, $j^1$ and connected at its opposite end with the lower link $g$ while its intermediate bight passes around a roller $k$ at the upper end of the trolley pole. L, L¹ represent two branch restoring lines which are connected with the lower end of the main line J and one of which extends to one end of the car and is connected with a hand lever $l$ on one end of the car body while the other extends to the other end of the car and is connected with a hand lever $l^1$ pivoted on the last mentioned end of the car. When the trolley leaves the wire the restoring bar may be elevated for bringing the trolley wire above the trolley wheel by pulling downwardly either one of the hand levers $l$, $l^1$. It is preferable, however, to effect this restoration of the trolley wire by pulling down the hand lever at the front end of the car and for this purpose the guide rollers $j$, $j^1$ are arranged on one side of the center of rotation of the trolley stand, so that the branch line leading to the front of the car is taut and in the most favorable condition for restoring the trolley while the branch line leading to the rear end of the car is slack and in a less favorable inoperative condition. This means of connecting the trolley restoring device with the hand levers $l$, $l^1$ permits of turning the trolley stand on top of the car for reversing the trolley without interfering with the restoring mechanism.

I claim as my invention:

1. The combination of a trolley pole, a trolley wheel mounted on the pole and adapted to engage with a trolley wire, a bar arranged in rear of the trolley pole and movable bodily vertically relatively to the pole and provided at its upper end with a fork adapted to engage said wire, a link connecting the upper part of said bar with said pole, and a movable connection between the lower part of said bar and the pole.

2. The combination of a trolley pole, a trolley wheel mounted on the pole and adapted to engage with a trolley wire, a vertically oscillating restoring bar arranged in rear of the trolley pole and provided with a fork adapted to engage the trolley wire, and upper and lower vertically swinging links pivotally connecting said restoring bar with said pole.

3. The combination of a trolley pole, a trolley wheel mounted on the pole and adapted to engage with a trolley wire, a vertically movable restoring bar arranged in rear of the trolley pole and provided with a fork adapted to engage the trolley wire and a short upper link and a long lower link connecting said restoring bar with said pole.

4. The combination of a trolley pole, a trolley wheel mounted on the pole and adapted to engage with a trolley wire, a vertically movable fork mounted on the pole and adapted to engage the wire, links pivotally connecting the fork with the pole and catch horns projecting laterally and upwardly from opposite sides of the pole.

5. The combination of a trolley pole, a trolley wheel mounted on the pole and adapted to engage with a trolley wire, a vertically movable restoring bar arranged in rear of the trolley pole and provided with a fork adapted to engage the trolley wire, links pivotally connecting the fork with the pole and catch horns projecting laterally and upwardly from said pole on opposite sides of said trolley wheel.

6. The combination of a car, a trolley stand pivoted on said car to turn horizontally, a trolley pole pivoted on said stand to turn vertically, a trolley wheel pivoted on said pole and adapted to engage a trolley wire, means operating to lift said pole and connecting parts, a pair of catch horns projecting upwardly and laterally from said pole on opposite sides of said trolley wheel, a vertically movable restoring bar arranged in rear of said pole and provided at its upper end with a fork, a roller pivoted in the crotch of said fork, an upper short vertically swinging link connecting the upper parts of said bar and pole, a lower vertically swinging link connecting the lower part of the bar with the pole, a spring operating normally to depress said bar and connecting parts, a guide on said trolley stand on the same side of its pivot as the pole mounted thereon, an upwardly looped main line having one end engaging with said guide and its other end connecting with said lower link, a roller over which the bight of said main line passes vertically swinging hand levers pivoted on opposite ends of the car, and branch lines connecting said levers with the main line below said guide.

Witness my hand this 23d day of August, 1910.

LORAN T. CHRISMAN.

Witnesses:
 THEO. L. POPP,
 ANNA HEIGIS.